E. C. DITTMAR.

FLOORING.

APPLICATION FILED APR. 9, 1919.

Reissued June 10, 1919.

14,660.

Witness

Floyd R. Cornwall.

Inventor

E. C. Dittmar.

By

Chas. A. Wright

Attorney

UNITED STATES PATENT OFFICE.

ELMER C. DITTMAR, OF WILLIAMSPORT, PENNSYLVANIA.

FLOORING.

14,660. Specification of Reissued Letters Patent. Reissued June 10, 1919.

Orginal No 1,268,694, dated June 4, 1918, Serial No. 108,892, filed July 12, 1916. Application for reissue filed April 9, 1919. Serial No. 288,894.

*To all whom it may concern:*

Be it known that I, ELMER C. DITTMAR, a citizen of the United States, residing at Williamsport, in the county of Lycoming and State of Pennsylvania, have invented certain new and useful Improvements in Flooring, of which the following is a specification, reference being had to the accompanying drawing.

This invention relates to certain new and useful improvements in flooring, the object being to provide a flooring which can be manufactured as a finished article to enable the same to be readily laid without refinishing the same thereby saving expense, time and labor in constructing a floor.

Another and further object of the invention is to provide a flooring which is provided with an interlocking joint formed by providing one of the edges of the flooring strip with oppositely beveled faces forming a substantially V-shaped tongue of substantially the same width as the thickness of the flooring strip, and the opposite edges of said strip with a substantially V-shaped groove of substantially the same width as the flooring strip, the edge portions of the strip adjacent the groove and tongue being rounded so as to produce in the complete floor a rounded V-shaped joint which can be readily cleaned with an ordinary mop thereby overcoming the disadvantages now existing in flooring now in use of the accumulation of dirt in the cracks between the joints, as in my construction a V-shaped groove is formed between the meeting edges of the flooring strips which can be readily cleaned.

Another and further object of the invention is to provide a flooring which can be stained and waxed before the same leaves the factory to enable the contractor to lay the flooring in order to produce a finished job without any further dressing; the individual strips being coated and finally finished ready for laying and having their edges so formed as to provide a tongue and groove connection between the adjacent strips with longitudinal grooves rounded in such manner as to prevent an observer from noticing or detecting any slight unevenness at the junction of adjacent strips, the form of the grooves being also adapted to permit them to be readily cleaned and the coating and finishing adapted to prevent the possibility of exposure of any unfinished surface in the floor when laid, thus rendering unnecessary any subsequent coating or dressing or other treatment to which floors as hereinbefore ordinarily constructed are subjected in order to produce an even surface and finished appearance.

Another and still further object of the invention is to provide a flooring in which a stronger joint with less material can be produced and one in which the nails can be driven in position without setting the same.

Other and further objects and advantages of the invention will be hereinafter set forth and the novel features thereof defined by the appended claims.

With these objects in view.

Like numerals of reference refer to like parts in the several figures of the drawing.

Figure 1:
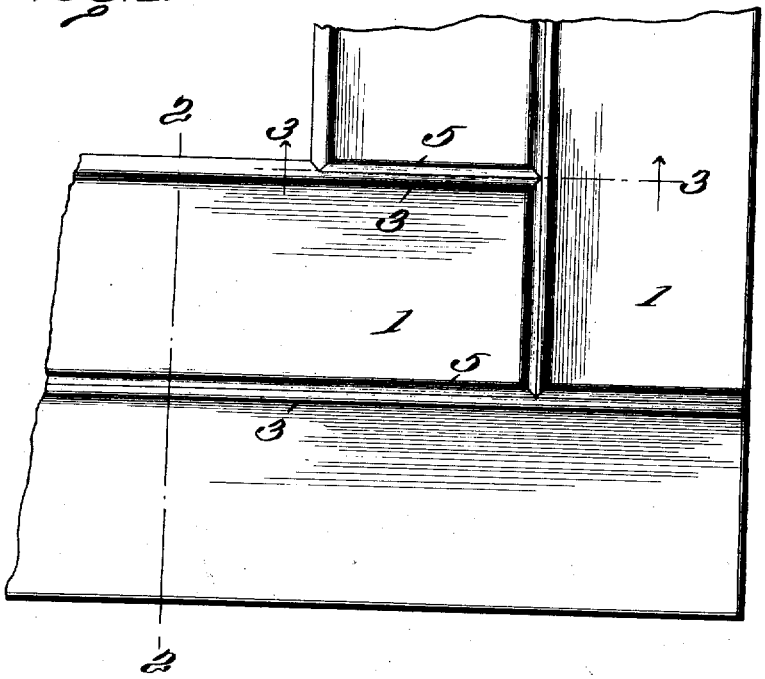
Figure 1 is a plan view of a portion of the floor constructed in accordance with my invention showing the manner of producing the corners.
Figure 2:
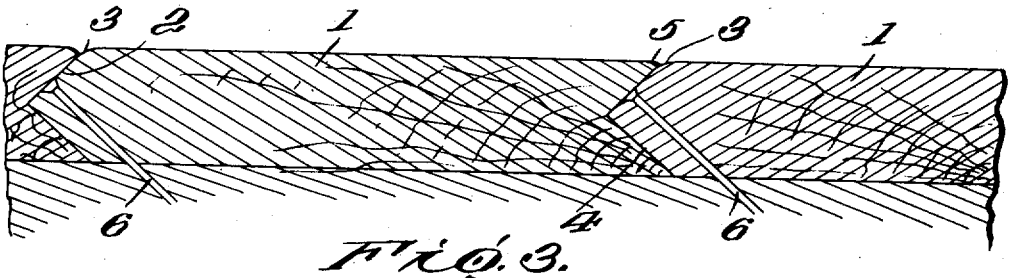
Fig. 2 is a section taken on line 2—2 of Fig. 1.
Figure 3:
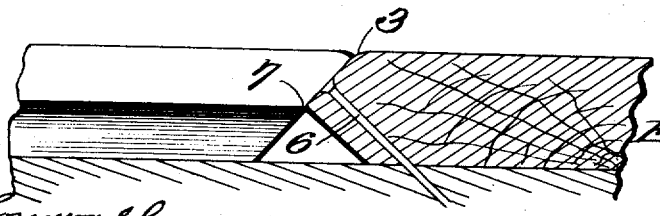
Fig. 3 is a section taken on the line 3—3 of Fig. 1.

In carrying out my invention I employ a strip of material 1 of any desired width having along one of its longitudinal edges a substantially V-shaped tongue 2 formed by beveling the strip upon opposite sides, which tongue is the same width as the thickness of the strip, the tongue being rounded as shown at 3 for the purpose hereinafter fully described. The opposite longitudinal edge is provided with a V-shaped groove 4 of the same width as the thickness of the flooring strip, the edges of the grooves being rounded as shown at 5 so that when a series of strips are assembled as shown in Figs. 1 and 2, and secured by nails 6, substantially V-shaped grooves having rounded edges 3 and 5 are formed between the assembled strips so as to allow for expansion and shrinkage, as the material from which the strip is made shrinks and expands. In assembling the various strips to produce a flooring as shown in Fig. 1, I form the corners by beveling the ends of the strips as shown at 7, so as to engage the beveled face of the tongue of the adjacent strip, but it is, of course, understood that I do not wish to limit myself to any particular manner of forming the corners as the ends of the strips could be provided with V-shaped grooves to receive the V-shaped tongues of the abutting strip.

As shown in Fig. 1, a flooring when laid in accordance with my invention is produced which has intersecting substantially V-shaped grooves having rounded edges between the abutting strips so as to allow the strips to expand and contract without making an uneven floor and at the same time a joint is formed which is very strong and one which will not show an open joint as the material shrinks and expands.

In the drawing I have illustrated flooring strips interlocked together by tongues and grooves, in order to produce a floor in which the abutting flooring strips provide a flooring surface having substantially V-shaped rounded grooves at the junction of the strips in order to provide a flooring in which the flooring strips can be manufactured at the mill and finished so that when placed in position in order to produce a floor, a finished floor is produced without further dressing in any way.

By this construction a V-shaped groove is formed between the abutting strips of the flooring which can be readily cleaned by simply passing a mop over the same thereby obtaining an advantage over the straight wall joint of the ordinary flooring now in use, as it is almost impossible to remove the dirt which accumulates in the joints of this class of flooring.

From the foregoing description it will be seen that I have provided an improved construction of flooring which can be manufactured as a completed article ready to be laid thereby dispensing with the dirt caused in laying the flooring and eliminating the expense of dressing to which the ordinary construction of floor must be subjected in order to produce an even surface, as in my improved construction any slight unevenness cannot be noticed, and a flooring is produced which is very serviceable and ornamental.

I claim:

1. As a new article of manufacture, a flooring strip having one of its longitudinal edges formed with beveled faces to provide a tongue of substantially V-shape in cross section, of a width equal to the thickness of the strip, said strip having its beveled faces rounded at the junction of the beveled faces with the face of the strip, and the other longitudinal edge grooved to form a substantially V-shaped groove of a width substantially the thickness of the strip, the edges of the groove being rounded.

2. A flooring strip having one of its longitudinal edges formed with a beveled face, and rounded at the juncture of said beveled face with the top face and the other longitudinal edge undercut on an incline corresponding to that of said beveled face and rounded from the surface to a line of intersection with the plane of said undercut, said strip being finally finished on at least its upper surface to an extent beyond the rounded edges so far as any possibility of exposure is presented, in a flooring composed of such strips.

ELMER C. DITTMAR.